United States Patent [19]

Selby, III

[11] Patent Number: 4,931,786
[45] Date of Patent: Jun. 5, 1990

[54] ELECTRONIC IMAGE DISPLAY SYSTEMS WITH IMPROVED CATHODE-RAY TUBE CONSTRUCTION

[75] Inventor: Howard W. Selby, III, Boulder, Colo.

[73] Assignee: Selsys Corporation, Boulder, Colo.

[21] Appl. No.: 156,387

[22] Filed: Feb. 16, 1988

[51] Int. Cl.⁵ .............................................. G09G 3/20
[52] U.S. Cl. ...................... 340/755; 358/60; 358/63
[58] Field of Search ............... 340/701, 702, 705, 716, 340/720, 722, 752–755, 789, 794, 795, 797; 358/60, 63, 75, 199, 206, 285, 293; 313/409, 412, 413, 415, 421, 422, 423, 428; 315/364, 366, 368, 375

[56] References Cited

U.S. PATENT DOCUMENTS

| | | | |
|---|---|---|---|
| 4,012,776 | 3/1977 | Mrdjen | 358/63 |
| 4,097,115 | 6/1978 | Garwin et al. | 358/63 |
| 4,099,172 | 7/1978 | Montanari et al. | 340/755 |
| 4,467,369 | 8/1984 | Alston | 358/75 |
| 4,578,710 | 3/1986 | Hasegawa | 358/60 |
| 4,717,248 | 1/1988 | LaRussa | 340/705 |
| 4,733,064 | 3/1988 | Ishikawa | 358/293 |
| 4,746,934 | 5/1988 | Schoening | 358/75 |
| 4,763,040 | 8/1988 | Vink et al. | 313/428 |
| 4,821,113 | 4/1989 | McQuade et al. | 358/75 |

FOREIGN PATENT DOCUMENTS 0042979  3/1985  Japan ..................................... 358/75

*Primary Examiner*—David K. Moore
*Assistant Examiner*—Richard Hjerpe
*Attorney, Agent, or Firm*—Neuman, Williams, Anderson & Olson

[57] ABSTRACT

Light weight, compact electronic image displays are provided which have flat profiles and which can be configured as direct view or projection displays. An improved cathode-ray tube utilizing two or more electron guns simultaneously produces two or more lines in separate phosphor stripes on the faceplate of cathode-ray tube, one phosphor for each electron gun. A vertical raster is produced mechanically by a rotating mirror mechanism and is positioned on a screen by way of optical elements. A controller and frame buffer synchronize electron gun output and vertical raster scanner operation to produce a bright, high resolution, converged image.

14 Claims, 4 Drawing Sheets

ELECTRONIC IMAGE DISPLAY SYSTEMS WITH IMPROVED CATHODE-RAY TUBE CONSTRUCTION

BACKGROUND OF THE INVENTION

1. Field of the Invention

This invention relates generally to electronic image display systems, and more particularly to direct view and projection color image display systems with an improved cathode-ray tube construction.

2. Description of Prior Art

Conventional full color displays are created through the use of three phosphors which are deposited on the faceplate of a cathode-ray tube. There is one phosphor for each of the primary colors which are mixed to produce full color. Each of the phosphors is energized by an independent electron gun. The phosphors are positioned on the inner surface of the faceplate of the cathode-ray tube as either a multitude of phosphor dot triplets, or as an array of narrow vertical stripes. The electron beam from each of three electron guns, one for each of the primary colors, passes through small openings in a shadow-mask before reaching and energizing the respective phosphors on the faceplate of the cathode-ray tube. The mask is positioned so that each electron beam strikes only its separate phosphor position (and respective color) while all remaining energy is absorbed by the mask. The mask produces a shadow over most of the phosphors allowing only the desired phosphor to be energized.

In conventional cathode-ray tubes, the electron beams from the electron guns are deflected both horizontally and vertically by either electrostatic or magnetic fields to produce an image. One complete scan produces a frame on the faceplate of the cathode-ray tube which is visible as an image to the viewer. The image is refreshed at such a rate as to produce a non-flickering image to the viewer.

Using a shadow mask technique limits the resolution of the cathode-ray tube due to the coarseness of the mask; there is a limit on how finely the mask can be made. Another drawback of the shadow mask relates to image brightness; up to 80% of the electron current is absorbed by the mask and is unavailable to energize the phosphor.

In addition to the resolution and brightness problems, conventional cathode-ray tubes are bulky; the tube depth is generally greater than the diagonal of the faceplate. The ultimate size of a direct-view cathode-ray tube is physically limited by the nature of a vacuum tube; larger tubes require thicker glass to accommodate faceplate strength resulting in heavier and heavier tubes.

It would be desirable to provide a direct view full color display based on a cathode-ray tube that is lightweight and compact, with higher resolution, and which has a flatter profile.

With respect to projection displays, heretofore such displays have been created by using three individual cathode-ray tubes, each with a different colored phosphor. Three separate optical systems are employed to combine the three individual images from the cathode-ray tubes into one image, typically being projected upon a diffusion or lenticular type screen.

One major problem with conventional projection display systems, however, is that their image resolution is limited by the practical size of projection tubes. A complex optical system is required to converge the three images from the three separate cathode-ray tubes onto the screen. Moreover, typical projection display systems with three cathode-ray tubes and three independent optical systems are costly, heavy and difficult to manufacture. In addition, since each cathode-ray tube is a separate full image display, a tradeoff must be made in order to provide cathode-ray tubes which are large enough to accomplish required image resolution and brightness, but not so large as to make the display system impractical.

SUMMARY OF THE INVENTION

This invention was evolved with the general object of providing a significantly higher resolution electronic color display, but which employs simplified optical systems in order to provide a lightweight, portable package that has great versatility in its configuration and which produces such an image with high resolution at a reasonable cost.

In this application "horizontal" refers to a line scan while "vertical" refers to a raster scan. It will be understood that the terms "horizontal" and "vertical" are used in this application for the purpose of describing relative orientations and directions and are not to be construed as limiting the system to any particular orientation.

The invention employs an improved cathode-ray tube which has a wide and flat profile and which accommodates two or more relatively narrow horizontal stripes of phosphor. The two or more stripes are activated by an equal number of electron guns, one for each of the colors. The electron beams are either electrostatically or magnetically deflected in a horizontal direction, but are not deflected in a vertical direction as is the case in a conventional cathode-ray tube, except to the extent necessary to preserve phosphor life. The electron beams from the electron guns activate their respective phosphors resulting in separate horizontal lines in vertically spaced parallel relation on the face of the cathode-ray tube, one for each phosphor stripe.

Since no shadow mask is used, a significant portion of the energy from the electron beam is converted into visible light. Furthermore, black is blacker than in a conventional display. In a conventional display, light reflects off the white phosphor which tends to wash out the black area turning it gray. In the present invention, the faceplate area of the cathode-ray tube is significantly smaller with only narrow stripes of phosphor, which reduces the reflected light problem and in turn produces a blacker black color.

The light from the cathode-ray tube is then directed to a vertical scanning mirror mechanism which through its rotation, mechanically produces a vertical raster scan of an image that is then directed to a screen for viewing. The image produced by the raster scanning of the lines from the cathode-ray tube is converged at the screen to produce a high resolution, full color image. Convergence can be achieved electronically as in the digital delayed convergence system of the invention, or optically. The screen can be an integral part of the display, as in a direct-view configuration of the invention, or the image can be projected upon an external or separate screen.

With a convergence system of the invention, convergence may be obtained either optically or electronically and either analog or digital techniques may be used in electronic convergence in what is referred to herein as a digital delayed convergence system, portions of the image input signal which correspond to the three color components of a line of different delay times relative to the portion of the image input signal which corresponds to the third color in a manner such that convergence is obtained in the eye of the viewer. For example, during each horizontal scan period, images of spaced red, green and blue lines may be produced in spaced parallel relation at the viewing screen. At the image of the blue line, the eye of the viewer will retain images of the green and red lines which were produced at previous times at the same location of the viewing screen. Alternatively, the convergence can be achieved by optically merging the three color lines on top of each other prior to or at the display screen.

As already noted, conventional display resolution is limited by the shadow mask. Since the present invention has no shadow mask, resolution is limited by phosphor fineness and spot size of the focused electron beam at the phosphor. For example, a cathode-ray tube in the present invention with an active faceplate area of six inches wide by ¾ inch high can produce the same resolution as a conventional projection display with three 6 inch by 5 inch cathode-ray tubes.

The system, methods and constructions of the invention have important advantages with respect to obtaining improved resolution and brightness and with respect to obtaining high efficiency. The displays are compact and light in weight and a relatively flat profile is possible. Also, the systems and constructions of the invention are readily and economically manufacturable.

Accordingly, the following are objects and advantages of the invention: to provide a full color electronic display system with improved image quality and to provide such a display incorporating a simplified optical system in order to reduce the systems' size, weight and cost.

Further objects and advantages of the present invention are: to provide an improved cathode-ray tube as a light source for the display, to provide a display having improved image resolution, to provide a blacker black color on the screen, to provide a display capable of full color or specialized color combinations and to provide a display capable of a wide variety of configurations including direct view and projection orientations.

A further object of the present invention is to provide a display that is compact and light with a flat profile which can be used in portable computer environments as well as wall mounted configurations.

This invention contemplates other objects, features and advantages which will become more fully apparent from the following detailed description taken in conjunction with the accompanying drawings.

Figure 1:
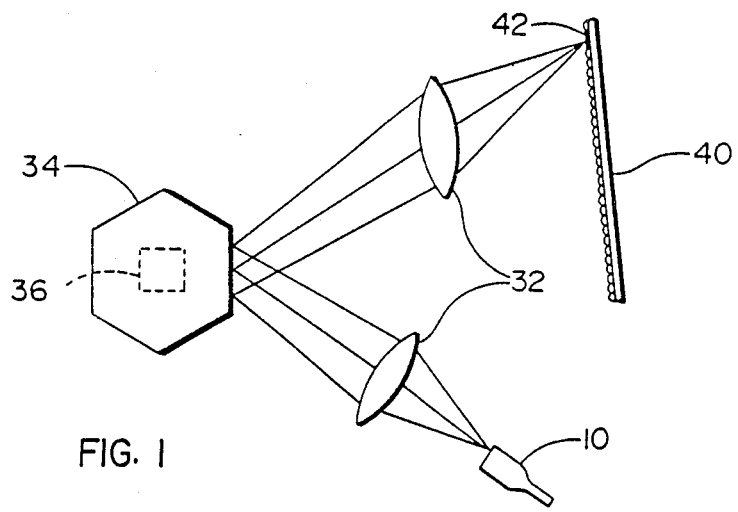
FIG. 1 illustrates diagrammatically one preferred form of display system of the invention.

The components identified by the reference numerals in the drawings are as follows:

| Reference Numeral | Component |
| --- | --- |
| 10 | cathode-ray tube |
| 12 | electron gun #1 |
| 14 | electron gun #2 |
| 16 | electron gun #3 |
| 18 | vertical positioner |
| 20 | horizontal deflection mechanism |
| 22 | frame buffer |
| 24 | target faceplate area of 10 |
| 26 | first phosphor stripe on inner surface of 24 |
| 28 | second phosphor stripe on inner surface of 24 |
| 30 | third phosphor stripe on inner surface of 24 |
| 32A and 32B | optical elements |
| 34 | vertical scanner mechanism |
| 36 | vertical scanner drive motor |
| 38 | controller |
| 40 | screen |
| 42 | photosensor |
| 44 | image input circuit |
| 46 | manual adjuster |

DESCRIPTION OF PREFERRED EMBODIMENTS

Referring now to the drawings, wherein like numerals represent like or corresponding elements throughout the several views, there is shown in FIG. 1 a schematic of the basic elements of the present invention; the cathode-ray tube 10, the mechanical vertical scanning mechanism 34 and associated drive motor 36, optical line elements 32A and 32B, and a screen 40. The cathode-ray tube 10 is a triple-electron-gun tube and it produces three line traces on the faceplate phosphors which in turn emit visible light to be propagated through lens element 32A to the vertical scanner mechanism 34, and thence through lens element 32B to a screen 40.

Figure 2A:
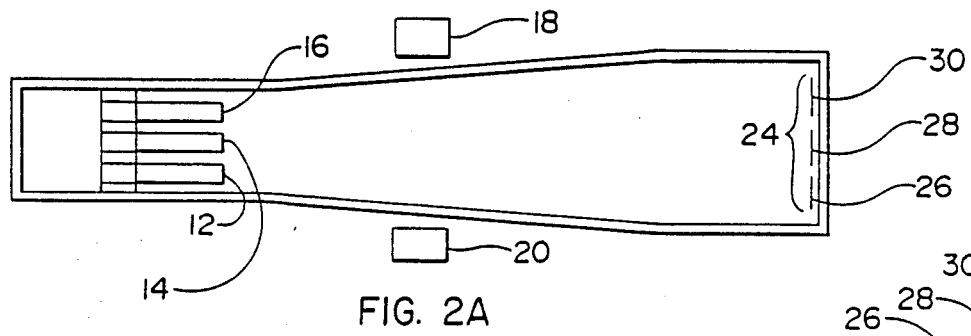
FIGS. 2A, 2B and 2C are respectively diagrammatic top plan, side elevational and front elevational views of a cathode ray tube of the system of FIG. 1.
Figure 2B:
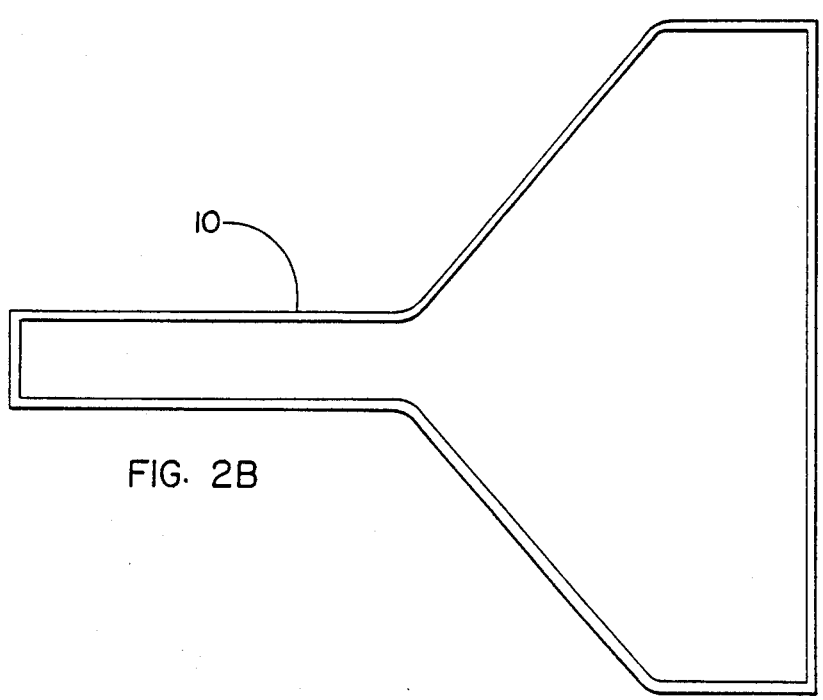
Figure 2C:
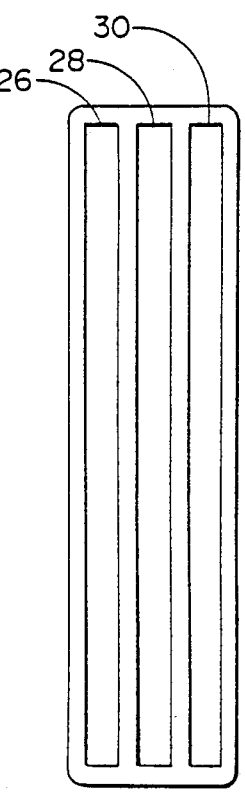

FIG. 2 shows the cathode-ray tube 10 in greater detail. The envelope of the cathode-ray tube has a wide horizontal and short vertical faceplate, a funnel and conventional neck. This shape accommodates several horizontal phosphor stripes located on the inner surface of the faceplate 24. It will be understood that the terms "horizontal" and "vertical" are used herein and in the claims for the purpose of describing relative orientations and directions and are not to be construed as limiting the system to any particular orientation.

There are three electron guns 12, 14, and 16 in the tube 10 each of which is capable of launching an electron beam onto three separate phosphor stripes, 26, 28 and 30, located on the inner surface of the cathode-ray tube faceplate 24. Alternatively, the stripes could be one broadened band of phosphor with color differentiation being created by the use of three strip filters, one for each electron gun.

Each electron gun produces a single horizontal line trace on its respective phosphor by way of a horizontal deflection mechanism 20. The deflection is accomplished with either electrostatic or magnetic fields. The cathode-ray tube produces only three horizontal lines at any one time, one line from each electron gun.

In a conventional display, the electron guns activate the phosphor on the faceplate of the cathode-ray tube by writing a series of lines down the surface of the display. In standard television displays there are 525 lines for each frame. Once the phosphor is activated by the electron beam it continues to emit visible light during its decay period.

Since the faceplate of the cathode-ray tube is the viewing area in a conventional display, the entire image or frame is produced on the faceplate of the cathode-ray tube. The image is formed by the series of lines of activated phosphors which are written down the surface of the faceplate.

In the present invention, only one line is written to the faceplate of the cathode-ray tube, not 525 lines (there are actually three lines on the cathode-ray tube, one for each of three colors). Rather than writing the image on the faceplate of the cathode-ray tube as in a conventional display, the cathode-ray tube of the present invention writes the series of lines sequentially using successive single line traces, i.e., each successive line of the frame is produced by the same phosphor line on the cathode-ray tube, not a series of lines down the phosphor surface of the cathode-ray tube as in a conventional display. The individual lines are then mapped to a screen by a mechanical scanning mechanism to form the frame.

The phosphor in the present invention must decay more quickly than the phosphor in a conventional display to allow the successive writing of lines of the frame on the single line of the cathode-ray tube. Although the total energy emitted is the same as in a conventional display, the energy is emitted in a shorter period of time.

An example may serve to clarify this. If in a conventional display the screen frame is refreshed 30 times each second and there are 525 lines per frame it will take approximately 60 microseconds to write each line. In a non-interlaced display, after writing the 525 lines down the screen, the electron beam is redirected to the top of the screen to begin the process again. In an interlaced display, after writing 262½ lines to the screen, the electron beam is redirected to the top of the screen and the next series of 262½ lines are written to fall between the lines produced in the previous field. In either case, 525 lines are produced in each frame and each frame is produced 30 times every second. The phosphor must decay fast enough to allow the next frame of lines to be written to the screen.

Assume the same number of lines and refresh rate for the present invention. The phosphor needs to decay fast enough to allow the 525 lines of a frame to be written to the same phosphor line. This means that the phosphor must decay within the time it takes to write one line. When that one line is written, the electron beam moves back to the beginning of the line to write the next line in the same location. The first line must decay fast enough to allow the phosphor to be activated by the next line scan of the electron beam.

In this example, the phosphor in the present invention releases its energy faster than the energy is released by conventional television phosphor. Yet the overall efficiency of the phosphors would be relatively similar.

In some cathode-ray tube configurations of the present invention it may be necessary to provide a means to dissipate heat build-up at the faceplate of the tube, such as a conventional cooling arrangement using a liquid or other heat transfer medium.

The human eye integrates the image on the basis of the energy it receives. Since the energy output of the present invention is equivalent to that of a conventional display, the integration can be made.

The phosphor stripes 26, 28 and 30 correspond to three primary colors which are ultimately mixed through a process called digital delayed convergence to produce a full color image. Alternatively, the convergence may be accomplished by optically merging the three separate lines from the cathode-ray tube on top of each other at the display screen.

FIG. 1 shows the path of the light produced by the cathode-ray tube 10 from the tube to the screen 40. The three lines generated by the cathode-ray tube 10 are directed to the vertical scanner mechanism 34 and then redirected from the scanner mechanism to the screen 40 using optical elements 32A and B. The vertical scanner mechanism 34 is a rotating multi-sided mirror driven by a drive motor 36 which can direct the output from the cathode-ray tube to various locations down the screen 40. As each line is scanned in the cathode-ray tube by virtue of the electrostatic or electromagnetic deflection mechanism, the mechanical scanner 34 is moving the image of the line down one line width on the screen to the precise position on the screen so the next line can be written. The process is repeated to complete a raster scan of the entire frame.

Figure 3A:
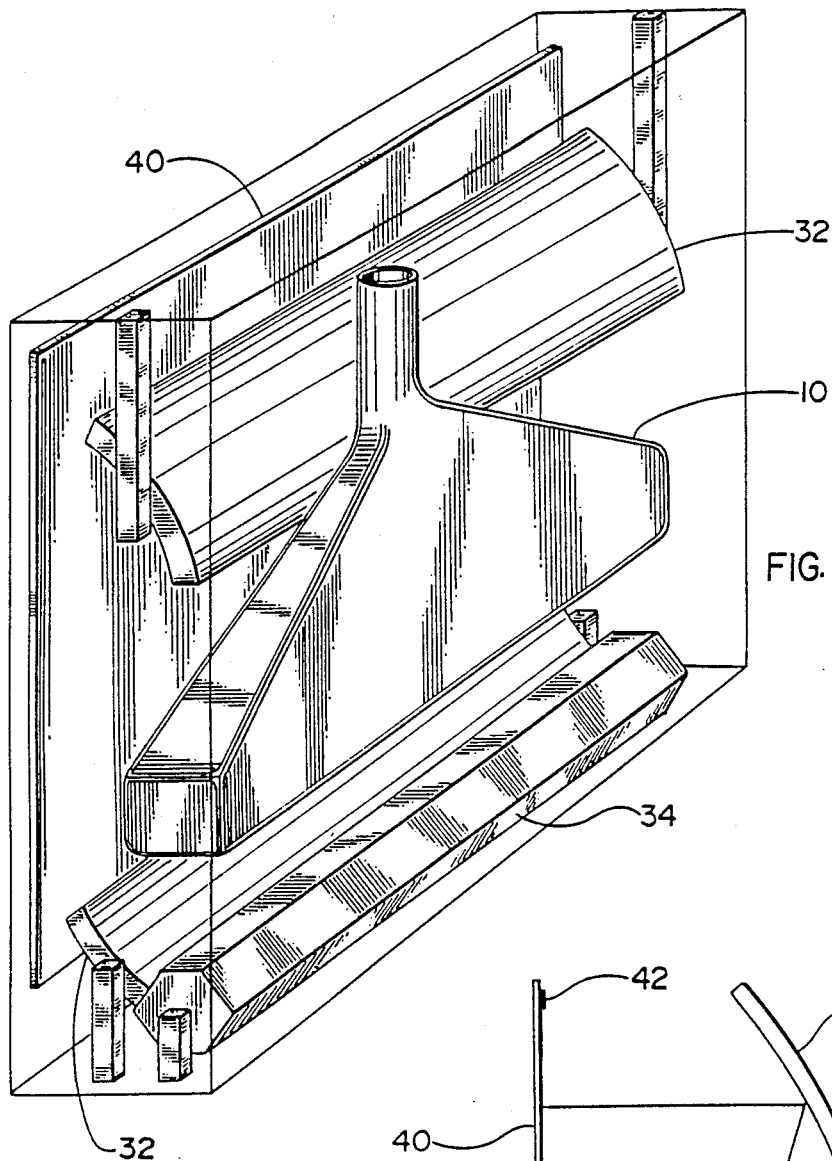
FIG. 3A is an isometric view illustrating another preferred form of display system of the invention.
Figure 3B:
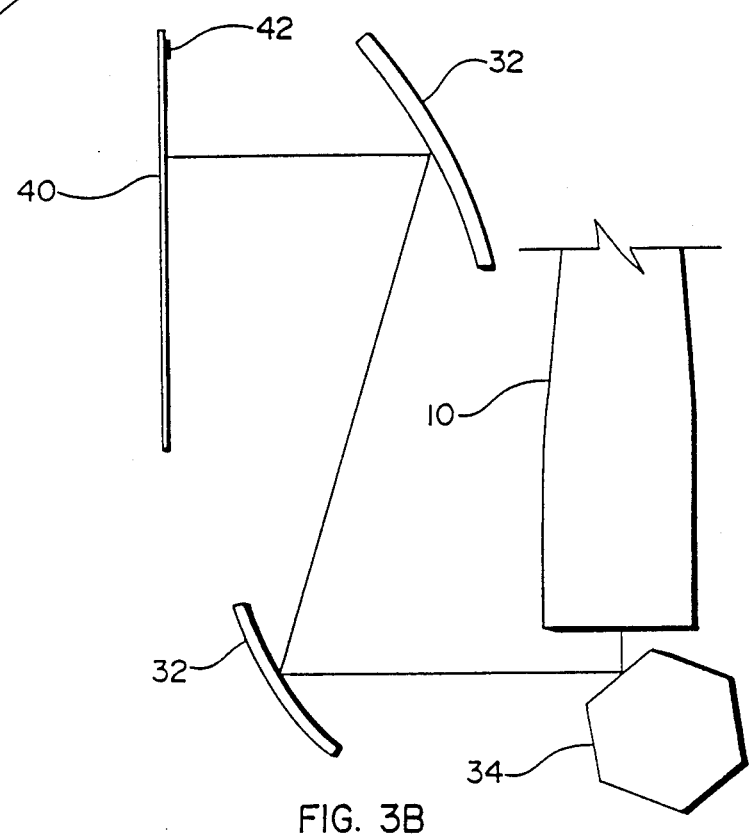
FIG. 3B is a diagrammatic side elevational view illustrating components of the system of FIG. 3A.

The light emitted by the cathode-ray tube can be directed to the screen 40 in several ways. FIGS. 3A and 3B are schematic diagrams showing one embodiment in which the optical path of the light as directed by the optical elements 32A and 32B is parallel to the axis of the neck of the cathode-ray tube 10 yielding a relatively flat profile for the display.

The screen 40 is preferably of a rear projection lenticular type which provides a broad viewing angle. (See U.S. Pat No. 3,832,032 Aug. 27, 1974). This configuration of the display is ideal for use in a portable computer environment or for a wall mounted television system.

Another potential configuration projects the converged image outside the display unit itself. The result is a projection display that can take full advantage of the simplified optics and high resolution of the present invention.

The lines produced by the cathode-ray tube and vertically scanned by the vertical scanner mechanism must be converged on the screen to create a full color image for the viewer. Convergence is achieved by regulating the output from specific electron guns so that three lines representing three primary colors for a particular image line converge at the same position on the screen in a sufficiently rapid time period so that a full color image is created in the eye of the viewer. The process is called digital delayed convergence.

Figure 4:
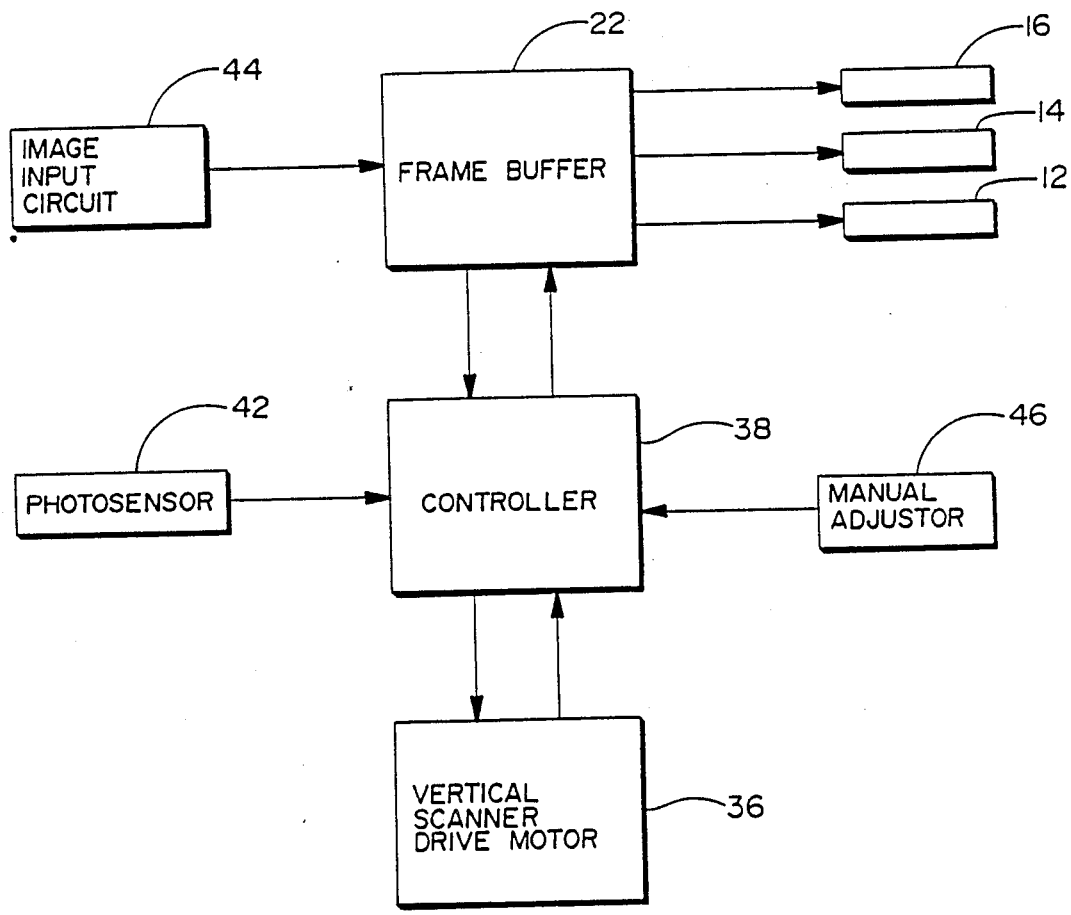
FIG. 4 is a schematic block diagram illustrating electronic components usable in either the system of FIGS. 1, 2A, 2B and 2C or the system of FIGS. 3A and 3B.

The output of the electron guns 12, 14 and 16 is coordinated with the action of the vertical scanner mechanism through the controller 38 and frame buffer 22 (FIG. 4). Image information in the form of an image signal conveying any type of image information, including television or other form of video signals and which may be supplied from an input circuit 44, is sent to the frame buffer 22 which processes the image signal and stores components thereof, the frame buffer 22 having the capability of storing a frame of components having a vertical dimension, in lines, which is at least equal to the number of lines from the top line to the bottom line of the cathode-ray tube 10. The frame buffer 22 includes circuitry for separating the applied signal into its component colors and storage means, preferably of digital form, for storing the color components in separate groups or "planes" of storage elements, one plane for each color to be stored, each plane corresponding to a number of horizontal lines of the display. Conventional color separation circuitry and conventional digital storage circuitry may be used, but it will be understood that equivalent types of analog storage means may be used.

The controller 38 controls the output of signals from the frame buffer 22 to the guns 12, 14 and 16, signals stored in the planes being applied to the guns with delays which correspond to the positions of the lines produced by the guns. The controller 38 also controls the application of control signals to a drive motor 36 for the vertical scanner mechanism 34 in order to synchronize the operation of the scanner mechanism 34 with that of the cathode-ray tube 10 and produce a converged image on the screen.

Convergence can be accomplished manually, or automatically. In the manual configuration, the viewer manually adjusts the controller 38, using manual adjuster 46, which in the case of a three color system, adjusts the delays of signals corresponding to two of the colors relative to the signal corresponding to the third color. The viewer continues to adjust the controller until a converged image appears on the screen.

In automatic convergence, or dynamic convergence, the position of each of the different colors is measured by one or more photosensors 42. The photosensor or photosensors can be located adjacent the screen, as in direct view display systems, or somewhere in the optical path, and a plurality of photosensors may be used at a number of locations, if desired. The position information is relayed to the controller which computes the required delay time differentials. These time differentials are translated into electron gun firing delays by the controller. The controller regulates which line of the image is sent from each of the planes of the frame buffer for each of the colors producing a full color converged image.

FIG. 5 illustrates the process of digital delayed convergence. A non-interlaced operation is shown and described for simplification, but it will be understood that the same principles apply to an interlaced operation and that this invention is not limited to either type of operation. At any given point in time, the cathode-ray tube produces three lines, one from each of the three phosphor stripes on the surface of the faceplate of the cathode-ray tube. The vertical scanner takes the succession of lines produced by the cathode-ray tube and produces a raster image on a screen. If there were only one line being produced by the cathode ray tube, the tube would produce a series of lines in rapid succession that make up a frame, or image. The lines are directed to the vertical scanner which directs each line of the frame onto a different location on a display screen thus producing the raster scan.

If a given frame was made up of 525 lines as in the television standard, line #001 would be directed to the top of the screen followed in rapid succession by lines #002 through #525 which are mapped sequentially down the surface of the screen. In conventional cathode-ray tubes, the entire frame is refreshed at a frequency of 60 Hz.

In the present invention, the three electron guns and the vertical scanner are simultaneously directing three lines to the screen, resulting in three images which must be converged to produce one full color image.

Figure 5A:
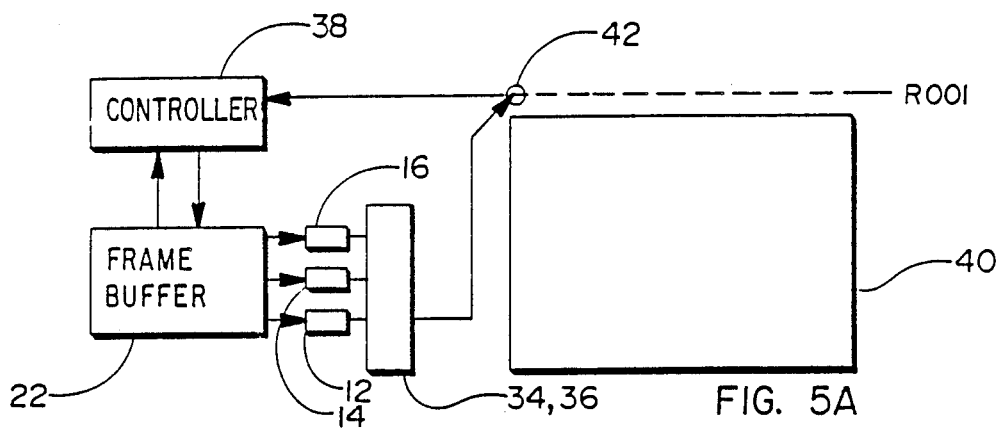
FIGS. 5A, 5B, 5C and 5D illustrate diagrammatically a process of digital delayed convergence of the invention.

In FIG. 5A, the firing sequence of the electron guns has just begun and represents time "0" (Time=0). Three lines, one for each primary color, for example red, green and blue, which are associated with an image are produced by the three phosphors in the cathode-ray tube. The vertical scanner mechanism directs those three lines onto the non-visible portion of the screen. (Lines on the non-visible portion of the screen are shown in FIG. 5 as dashed lines; the active line on the visible portion of the screen is shown as a bold-faced line.) The distance of separation between the lines on the screen is a function of the separation of the phosphor stripes on the faceplate of the cathode-ray tube.

Upon initiating the display, the controller 38 receives information from the photosensor 42 when different colored lines are centered on the photosensor. The controller then computes an appropriate time delay for subsequent electron gun firing so as to produce a converged image. For purposes of the example explained in FIG. 5, it is assumed that the distance of separation between different colored lines on the screen is approximately 100 lines. The electron gun firing sequence may be as follows to create a dynamically converged image:

Time=0, FIG. 5A: Red line #001 (R-001) emitted from electron gun 12 and directed to the screen 40 area by the vertical scanner mechanism 34 is centered on the photosensor 42. If the corresponding green line #001 (G-001) and blue line #001 (B-001) were simultaneously sent from the frame buffer 22 to the respective electron guns 14, 16 without any convergence or frame buffering, G-001 would be positioned approximately 100 lines above the red line R-001 and B-001 would be positioned approximately 100 lines above the green line. Because the controller 22 has made a computation of a 100 line spacing differential between the different colored lines on the screen, the controller 38 induces a timing delay in the release of image information from the frame buffer 22 to the respective electron guns 12, 14 and 16 to provide a converged image.

Figure 5B:
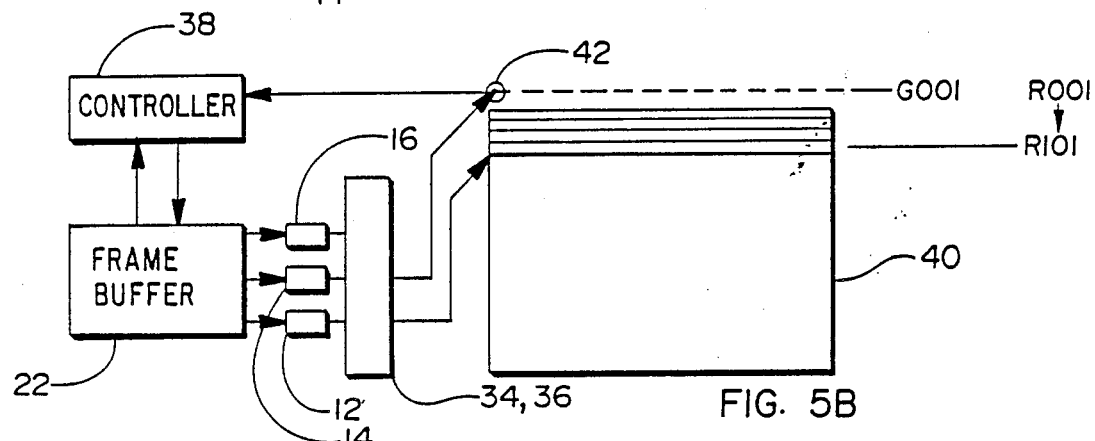

Time=100, FIG. 5B: The photosensor 42 detects G-101 and sends a signal to the controller 38. The controller computes a 100 line time differential between the time the red line (R-001) and the green line (G-001) are detected at the photosensor 42. A time delay of 100 lines for the firing of the green electron gun 14 with respect to the firing of the red gun 12 is transmitted to the green gun via the frame buffer 22, i.e., at the instant the red gun 12 is launching R-101, the green gun 14 is simultaneously launching G-001.

Figure 5C:
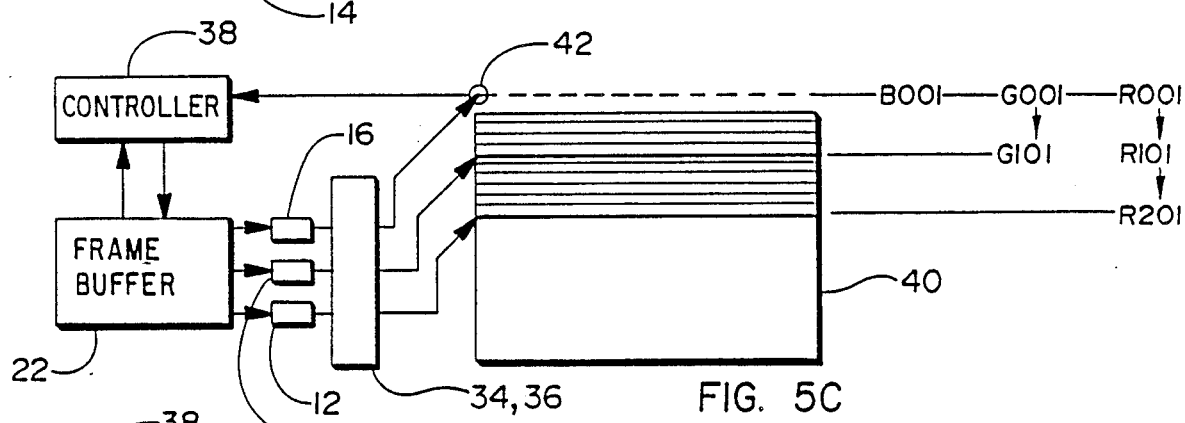

Time=200, FIG. 5C: The photosensor 42 detects B-001 and sends a signal to the controller 38. The controller computes a 100 line time differential between the time the green line (G-001) and the blue line (B-001) are detected at the sensor, and a 200 line time differential between the time the red line (R-001) and the blue line (B-001) are detected at the sensor. A time delay of 100 lines for the firing of the blue gun 16 and a time delay of 200 lines for the firing of the green gun 14 with respect to the firing of the red gun 12 is transmitted by the controller 38 to the respective guns via the frame buffer 22, i.e., at the instant the red gun 12 is launching R-201, the green gun 14 is launching G-101 and the blue gun 16 is launching B-001.

Figure 5D:
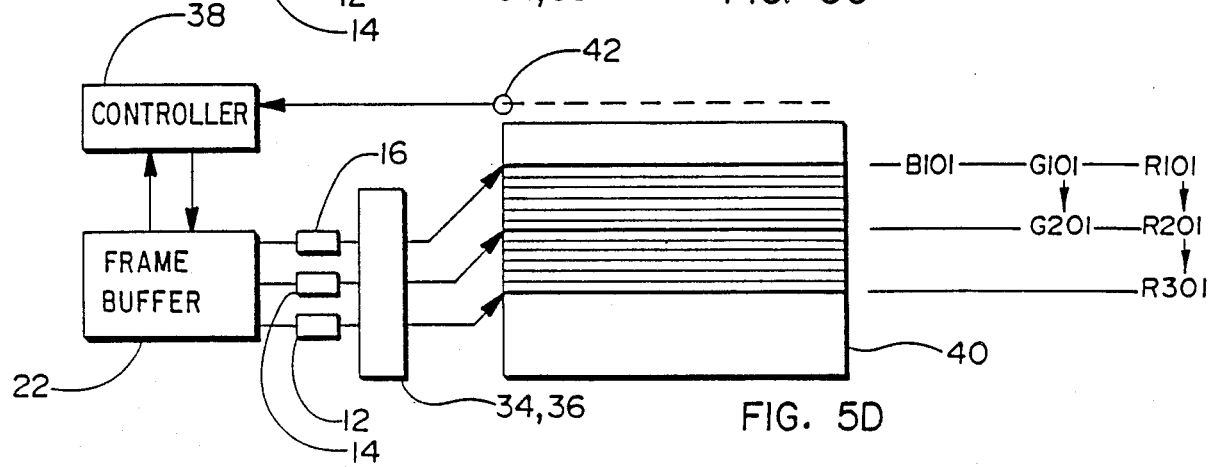

Time=300, FIG. 5D: The process continually repeats itself. If the line differential remains at 100 lines, then at Time=300-, the controller 38 would signal the frame buffer so that the red gun 12 would launch R-301, the green gun 14 would launch G-201 and the blue gun 16 would launch B-101.

The result of the digital delayed convergence process is that the controller and frame buffer synchronize the output of the electron guns and vertical scanner mechanism so that R-001 is mapped to the same screen location as G-001 and B-001. Although all three lines are mapped to the screen at slightly different times, the difference is not perceptible to the viewer; the three lines appear to converge and mix producing a full color line. The process is repeated for every line in the raster: R-002, G-002 and B-002 are mapped to the next line location, and so on through R-525, G-525 and B-525, producing the full color frame.

While the above description contains many specificities, the reader should not construe these as limitations on the scope of the invention, but merely as exemplifications of preferred embodiments thereof. Those skilled in the art will envision many other possible variations are within its scope. For example, skilled artisans will readily be able to change the dimensions and shape of the various embodiments.

The present invention may be embodied in other specific forms without departing from the spirit or essential attributes thereof and, accordingly, reference should be made to the appended claims, rather than to the foregoing specification, as indicating the scope of the invention.

I claim:

1. An electronic image display system for receiving a image signal from a incoming image signal source, said signal corresponding to a raster san of an image to be produced and including sequential line portions, each line portion containing color information for each of a plurality of different colors, said system comprising:
    a. line-developing means for receiving color information derived from color information of each line portion of an input image signal and for establishing in a line-developing region a plurality of spaced parallel horizontal lines of light of different colors;
    b. a screen for display of an image which corresponds to said image signal;
    c. means including vertical raster scanner means and associated optical means for projecting light of said horizontal lines of said line-developing region to said screen and to develop horizontal lines in a corresponding image region at said screen and for operating at vertical repetition rate to perform repetitive scans of said screen, said image region in each scan being moved in one direction at a certain vertical velocity relative to said screen to produce at said screen a raster scanned image from the said horizontal lines; and
    d. convergence means for timing application of color information of sequential line portions of an input image signal to said line-developing means in accordance with the order of development of said lines of different colors, the vertical spacing of said horizontal lines in said image region and said vertical velocity of movement across said screen to effect a convergence of the images produced at said screen from said horizontal lines of said line-developing means.

2. An electronic image display system according to claim 1 wherein said line-developing means comprises a cathode-ray tube and wherein said associated optical means comprises optical lens means operative to direct the output from the cathode-ray tube to the screen via the vertical raster scanner means.

3. An electronic display system according to claim 1 wherein said vertical scanner comprises a mechanical scanning mechanism including motive power means and wherein said associated optical means comprise movable optical means coupled to said motive power means and optical lens means for effecting light from said line-developing means to said screen, said optical lens means being located in at least one of a plurality of regions one being between said movable optical means and said line-developing means and another region being between said movable optical means and said screen.

4. An electronic display system according to claim 1 wherein said screen comprises a back-illuminated lenticular surface and is arranged to provide a broad viewing angle.

5. An electronic image display system as defined in claim 1, wherein said line-developing means include an improved cathode-ray device, said device comprising:
    a. elongated evacuated envelope means defining trajectory control space and electron-receiving target means defining a faceplate area;
    b. launching means for launching a plurality of electron beams into regions of the control space which are opposite the target faceplate region;
    c. beam directing means for directing the electron beams from the launching means causing the electron beams to strike the faceplate target area at selected vertically spaced locations thereof;
    d. horizontal deflection means located between the electron beams launching means and the target faceplate region causing the electron beams to strike the faceplate target region at selected positions along said vertically spaced locations, and
    e. phosphor means at said selected locations on the inner surface of said faceplate target region which are activated by the respective electron beams.

6. An electronic image display system according to claim 1 wherein said vertical raster scanner means comprises a mechanical scanner mechanism including motive power means and said associated optical means comprises movable optical means coupled to said motive power means.

7. An electronic image display system according to claim 6, wherein an image signal from said image signal source includes horizontal and vertical synchronizing pulse components, synchronization means for responding to said horizontal and vertical synchronizing pulse components for synchronizing the operation of said line-developing means and said vertical scanner means with an image signal from said incoming image signal source.

8. An electronic display system according to claim 1, wherein said line-developing means comprises cathode-ray tube means having a flat configuration with electron-receiving target means defining a faceplate area for producing said horizontal lines, said faceplate area having a relatively large horizontal dimension in a direction parallel to said lines and with a relatively small vertical dimension in a direction transverse to said lines.

9. An electronic display system according to claim 8, wherein said vertical scanner comprises a mechanical scanning mechanism including motive power means and wherein said associated optical means comprises movable optical means coupled to said motive power means and optical lens means including a series of reflecting surfaces located between said movable optical means and said screen, said series of reflecting surfaces being so arranged as to transmit light in a path folded along horizontally extending lines to provide a projection region with a small vertical dimension such as to cooperate with said line-developing means in providing a light projecting assembly having a relatively flat configuration.

10. An electronic display system according to claim 9, wherein said screen is located outside said relatively flat light projecting assembly formed by said line-developing means and said vertical scanner and associated optical means.

11. An electronic image display system as defined in claim 1 wherein said convergence means which corresponds to said color information of an input image signal and which are converged to be correlated in the eye of a viewer of said scanned image in said image plane.

12. An electronic image display system as defined in claim 11, said frame buffer means being operative to store color signal components and to apply said stored color signal components to said line-developing means after delays which correspond to the vertical spacing of said horizontal lines established by said line-developing means.

13. An electronic display method for display of an image at a projection screen corresponding to an image signal received from a incoming image signal source, said signal corresponding to a raster scan of an image to be produced and including sequential line portions, each line portion containing color information for each of a plurality of different colors, said method comprising the steps of establishing a plurality of horizontal lines of light of different colors which correspond to color information of an image signal received from an incoming image signal source and which are in vertically spaced parallel relation, projecting said lines to said projection screen to produce corresponding horizontal lines at an image plane at said projection screen, periodically effecting scanning at a vertical repetition rate to perform repetitive vertical scans of said projection screen with each vertical scan being performed at a certain vertical velocity relative to said projection screen so as to produce a raster scanned image in said image plane, and controlling the establishment of said lines from color information of sequential line portions of an incoming image signal to produce line images which correspond to said color information of an input image signal and which are converged to be correlated in the eye of a viewer of said scanned image in said image plane.

14. A method as defined in claim 13 wherein in establishing said lines color information of sequential line portions of an image signal are buffered and applied with delays which correspond to the vertical spacing of said lines.

* * * * *